United States Patent
Ishii

(10) Patent No.: US 8,762,643 B2
(45) Date of Patent: Jun. 24, 2014

(54) CONTROL METHOD FOR DISK ARRAY APPARATUS AND DISK ARRAY APPARATUS

(75) Inventor: Takanori Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 13/013,007

(22) Filed: Jan. 25, 2011

(65) Prior Publication Data
US 2011/0197036 A1    Aug. 11, 2011

(30) Foreign Application Priority Data
Feb. 5, 2010    (JP) ................................. 2010-024619

(51) Int. Cl.
*G06F 12/00*    (2006.01)

(52) U.S. Cl.
USPC ........................................................ 711/118

(58) Field of Classification Search
USPC .......... 711/113; 714/14, 6.3, 6.21, 20, 21, 22, 714/24
See application file for complete search history.

(56) References Cited

U.S. PATENT DOCUMENTS

| | | | |
|---|---|---|---|
| 7,100,074 B2 * | 8/2006 | Watanabe et al. | 714/5.1 |
| 7,613,877 B2 * | 11/2009 | Shimozono et al. | 711/113 |

FOREIGN PATENT DOCUMENTS

| | | | | |
|---|---|---|---|---|
| JP | 5-035614 | A | 2/1993 | |
| JP | 6-309232 | A | 11/1994 | |
| JP | 6-309234 | A | 11/1994 | |
| JP | 2006-277205 | A | 10/2006 | |
| JP | 2008-108026 | A | 5/2008 | |
| WO | WO-2009120195 | A1 * | 10/2009 | H01M 10/48 |

* cited by examiner

*Primary Examiner* — Brian Peugh
(74) *Attorney, Agent, or Firm* — Fujitsu Patent Center

(57) ABSTRACT

According to an aspect of the embodiment, in a control method for a disk array apparatus, a CPU of a first control module acquires other system state information, which is decided based on a battery and a nonvolatile memory of the second control module and indicates a data saving possibility of a cache memory of a second control module. The CPU of the first control module determines, based on the other system state information acquired and own system state information, which is decided based on a battery and a nonvolatile memory of the first control module and indicates a data saving possibility of a cache memory of the first control module, whether the disk array apparatus is set in a write-back state or a write-through state.

8 Claims, 9 Drawing Sheets

| No | DIAGNOSIS ITEM | DIAGNOSIS TIMING |
|---|---|---|
| 1 | SIZE OF DIRTY DATA (WRITE) | SIZE FIXING |
| 2 | BATTERY CAPACITY | CAPACITY CHECK ITSELF IS PERFORMED DURING START, DURING POWER RECOVERY, OR ONCE A WEEK |
| 3 | FLASH MEMORY SAVING AREA | SAVING AREA CHECK ITSELF IS PERFORMED DURING START OR DURING POWER RECOVERY |
| 4 | DIAGNOSIS RESULT OF OTHER SYSTEM CM | NOTIFY BY INTER-CM MONITORING PATH |

1513 (CM#0)

| No | OWN SYSTEM CM | | DATA SAVING SYSTEM OF OWN SYSTEM | STATE OF OTHER SYSTEM CM IS ALL WRITE DATA POSSIBLE? (Data#0+#1) | APPARATUS STATE | APPARATUS STATE OF SYSTEM SHOWN IN FIG. 9 |
|---|---|---|---|---|---|---|
| | BATTERY CAPACITY | FLASH MEMORY SAVING AREA | | | | |
| 1 | ALL WRITE DATA POSSIBLE (Data#0+#1) | ALL WRITE DATA POSSIBLE (Data#0+#1) | ALL WRITE DATA (Data#0+#1) Destage | Yes | WRITE-BACK | WRITE-BACK |
| 2 | | | | No | WRITE-BACK | WRITE-THROUGH |
| 3 | | OWN SYSTEM WRITE DATA POSSIBLE (Data#0) | OWN SYSTEM WRITE DATA (Data#0) Destage | Yes | WRITE-BACK | |
| 4 | | | | No | WRITE-THROUGH | |
| 5 | | BACKUP IMPOSSIBLE | CACHE BACK UP | Yes | WRITE-BACK | |
| 6 | | | | No | WRITE-THROUGH | |
| 7 | OWN SYSTEM WRITE DATA POSSIBLE (Data#0) | ALL WRITE DATA POSSIBLE (Data#0+#1) | OWN SYSTEM WRITE DATA (Data#0) Destage | Yes | WRITE-BACK | |
| 8 | | | | No | WRITE-THROUGH | |
| 9 | | OWN SYSTEM WRITE DATA POSSIBLE (Data#0) | OWN SYSTEM WRITE DATA (Data#0) Destage | Yes | WRITE-BACK | |
| 10 | | | | No | WRITE-THROUGH | |
| 11 | | BACKUP IMPOSSIBLE | CACHE BACK UP | Yes | WRITE-BACK | |
| 12 | | | | No | WRITE-THROUGH | |
| 13 | BACKUP IMPOSSIBLE | ALL WRITE DATA POSSIBLE / OWN SYSTEM WRITE DATA POSSIBLE / BACKUP IMPOSSIBLE | CACHE BACK UP | Yes | WRITE-BACK | |
| 14 | | | | No | WRITE-THROUGH | |

FIG. 4

| No | OWN SYSTEM CM | | DATA SAVING SYSTEM OF OWN SYSTEM |
|---|---|---|---|
| | BATTERY CAPACITY | FLASH MEMORY SAVING AREA | |
| 1 | ALL WRITE DATA POSSIBLE (Data#0+#1) | ALL WRITE DATA POSSIBLE (Data#0+#1) | ALL WRITE DATA (Data#0+#1)Destage |
| 2 | | | |
| 3 | | OWN SYSTEM WRITE DATA POSSIBLE (Data#0) | OWN SYSTEM WRITE DATA (Data#0)Destage |
| 4 | | | |
| 5 | | BACKUP IMPOSSIBLE | CACHE BACK UP |
| 6 | | | |
| 7 | OWN SYSTEM WRITE DATA POSSIBLE (Data#0) | ALL WRITE DATA POSSIBLE (Data#0+#1) | OWN SYSTEM WRITE DATA (Data#0)Destage |
| 8 | | | |
| 9 | | OWN SYSTEM WRITE DATA POSSIBLE (Data#0) | OWN SYSTEM WRITE DATA (Data#0)Destage |
| 10 | | | |
| 11 | | BACKUP IMPOSSIBLE | CACHE BACK UP |
| 12 | | | |
| 13 | BACKUP IMPOSSIBLE | ALL WRITE DATA POSSIBLE / OWN SYSTEM WRITE DATA POSSIBLE / BACKUP IMPOSSIBLE | CACHE BACK UP |
| 14 | | | |

CONTROL METHOD FOR DISK ARRAY APPARATUS AND DISK ARRAY APPARATUS

CROSS-REFERENCE TO RELATED APPLICATIONS

This application is based upon and claims the benefit of priority of the prior Japanese Patent Application No. 2010-024619, filed on Feb. 5, 2010, the entire contents of which are incorporated herein by reference.

FIELD

The embodiments discussed herein are related to a control method for a disk array apparatus and the disk array apparatus.

BACKGROUND

A disk array apparatus includes a cache memory (a disk cache memory), which is a high-speed device, to reduce data access time. Further, the disk array apparatus includes a nonvolatile memory to save data stored in the cache memory, which is a volatile memory. As the nonvolatile memory, a flash memory (an EEPROM) is used. Consequently, when a main power supply for the disk array apparatus is failed, data stored in the cache memory is saved in the nonvolatile memory.

In a storage device system, it is proposed to provide, in each node, a cache memory, a nonvolatile memory, a copy unit which copies write data stored in each cache memory of the own node and other nodes to the nonvolatile memory, operation-mode switching means for separating the copy means from processing and switching the copy means to a write-through operation when a failure of an inter-copy means interface is detected, write-back means for writing, when an operation mode is switched, the write data stored in the nonvolatile memory in a disk device, and diagnosing means for diagnosing the copy means at a time of a startup after the copy means is replaced.

In a computer system that performs disk cache, there is proposed a control system for the disk cache for selecting a copy-back system or a write-through system of the disk cache control by comparing remaining power of a rechargeable battery detected by remaining-power detecting means and a voltage setting value set by the voltage-value setting means.

In a disk control apparatus, there is proposed means for supplying, when an electric power failure occurs, an electric power failure detection signal from a power supply circuit to a read/write circuit, automatically starting the read/write circuit according the electric power failure detection signal, performing data transfer from a disk cache memory to an EEPROM according to a predetermined parameter value, and saving data of a write cache in the EEPROM.

In a storage system, it is proposed to provide, in addition to a volatile cache memory, a nonvolatile memory that is a memory of a type capable of continuing to store data irrespective of presence or absence of power supply, to set a volatile cache memory as a temporary storage destination of data according to an access command from a host apparatus, and to copy, when power supply from a primary power supply to the volatile cache memory is absent, data stored in the volatile cache memory to the nonvolatile memory by a power supply from a battery.

In a backup apparatus including a nonvolatile memory to which a battery is built-in, it is proposed to provide means for detecting that a power supply voltage reaches an intermediate voltage between a voltage at which write protection is applied to a memory and a normal power supply voltage, and for interrupting to a central processing unit, means for detecting that the power supply voltage reaches an intermediate voltage between a voltage at which interruption is applied by this means and the voltage at which the write protection for the memory is applied, and for applying reset to the central processing unit, and means for setting a most significant bit of an address bus to 0 such that an address allocated to the memory is not selected when the reset is applied by this means.

Patent Document 1: Japanese Laid-Open Patent Publication No. 2006-277205
Patent Document 2: Japanese Laid-Open Patent Publication No. 06-309232
Patent Document 3: Japanese Laid-Open Patent Publication No. 06-309234
Patent Document 4: Japanese Laid-Open Patent Publication No. 2008-108026
Patent Document 5: Japanese Laid-Open Patent Publication No. 05-35614

During the electric power failure of the main power supply for the disk array apparatus, an electric power for data saving is supplied from a battery to a CPU, a cache, a nonvolatile memory, and a controller for the nonvolatile memory. However, the electric power that can be supplied by the battery, in other words, a battery capacity gradually deteriorates depending on outside temperature and the number of times of charging. Therefore, at a time when the electric power failure of the main power supply for the disk array apparatus, term in which the electric power for the data saving can be supplied also gradually decreases and an amount of data that can be saved also gradually decreases.

On the other hand, in a flash memory used as the nonvolatile memory, there is a limit in a number of times of writing. In other words, since a memory cell is destroyed little by little while writing is repeated, a writable area, in other words, a saving area gradually decreases.

Therefore, there is a possibility that, during the electric power failure of the main power supply for the disk array apparatus, entire data stored in the cache memory, in other words, data equivalent to a cache capacity cannot be saved in the nonvolatile memory (a state in which the data cannot be saved occurs). This is due to both or one of the deterioration in the battery life and the decrease in the writable area of the nonvolatile memory. In this case, since the data stored in the cache memory cannot be guaranteed, the disk array apparatus needs to change a write-back state at that time to a write-through state.

FIG. 9 is a saving processing flowchart of the cache memory in the disk array apparatus.

The disk array apparatus determines whether the battery capacity is equal to or larger than the capacity of a cache memory, in other words, the battery capacity is equal to or larger than a battery capacity which can save the data of the cache memory to a flash memory, and determines whether a saving area of the flash memory is equal to or larger than the capacity of the cache memory (step S101). When the battery capacity is equal to or larger than the cache capacity and the saving area of the flash memory is equal to or larger than the cache capacity, the disk array apparatus continues the write-back state (step S102). When the battery capacity is smaller than the cache capacity, or when the saving area of the flash memory is smaller than the cache capacity, the disk array apparatus changes the write-back state to the write-through state (step S103).

In the write-back state, at a point when data from a host computer is stored in the cache memory, the disk array apparatus issues a notification of writing completion to the host computer. However, in the write-through state, the disk array apparatus does not issue the notification of writing completion to the host computer until the data from the host computer is stored in a disk. Therefore, the performance of the disk array apparatus from the viewpoint of the host computer is deteriorated by the change.

SUMMARY

According to an aspect of the embodiment, a control method for a disk array apparatus disclosed herein is a control method for a disk array apparatus including first and second control modules, and a disk array for storing data which is written or read by the first and second control modules. Each of the first and second control modules includes a cache memory, a battery that supplies electric power to the cache memory during an electric power failure of a main power supply for the disk array apparatus, a CPU that writes data in the cache memory, and a nonvolatile memory to which the data of the cache memory is saved. The control method includes acquiring, at the CPU of the first control module, other system state information being decided based on the battery of the second control module and the nonvolatile memory of the second control module, and indicating a data saving possibility of the cache memory of the second control module; and determining, at the CPU of the first control module, based on the other system state information acquired and own system state information being decided based on the battery of the first control module and the nonvolatile memory of the first control module, and indicating a data saving possibility of the cache memory of the first control module, whether the disk array apparatus is set in a write-back state or a write-through state.

With the disk array apparatus disclosed herein, the disk array apparatus can operate in the write-back state even when the battery life is deteriorated or the writable area of the nonvolatile memory decreases. Therefore, it is possible to reduce a period in which writing speed performance falls.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4 and 5 are diagrams illustrating examples of a data saving mode table;

DESCRIPTION OF EMBODIMENTS

Preferred embodiments of the present invention will be explained with reference to accompanying drawings.

Figure 1:
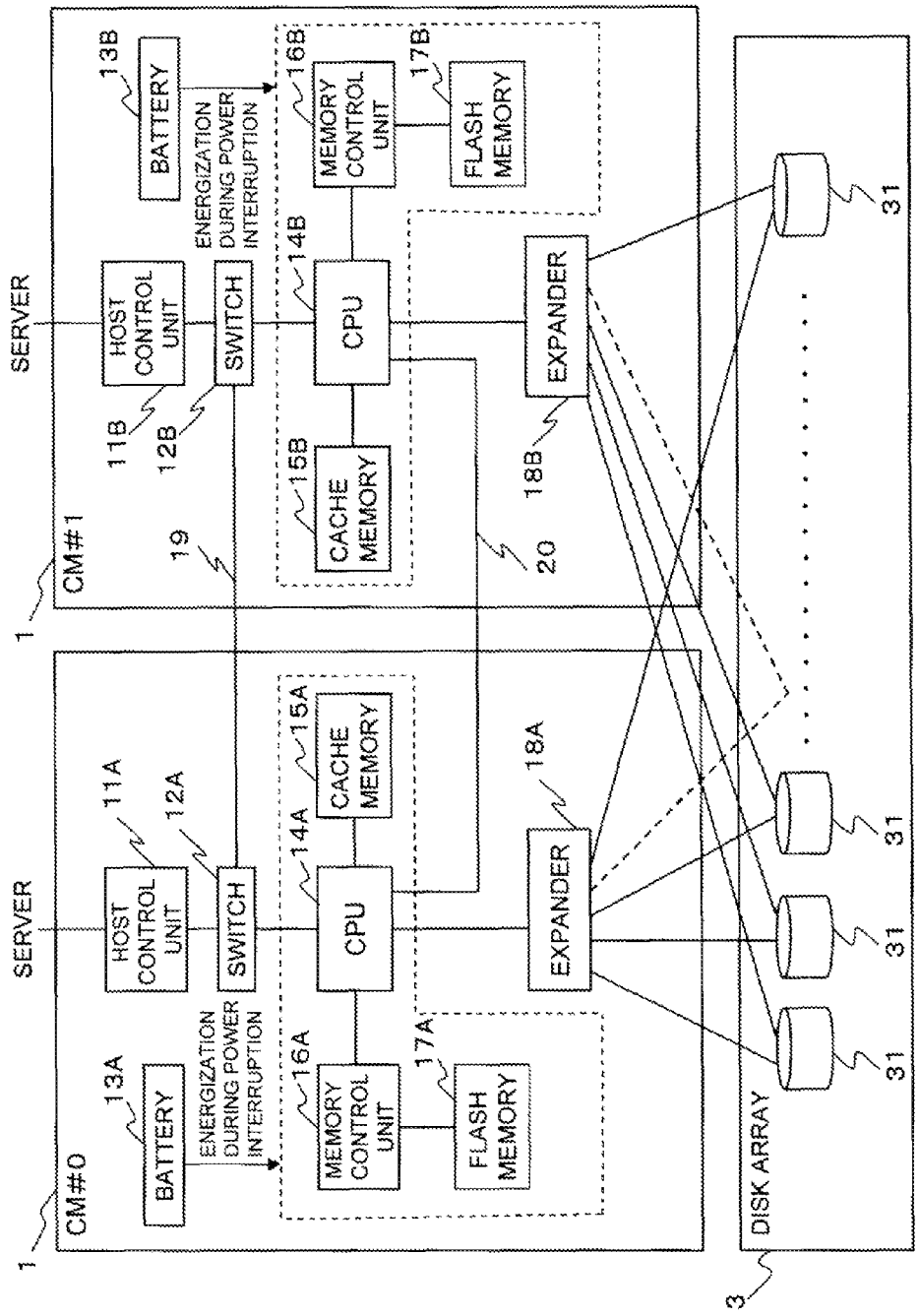
FIG. 1 is a diagram illustrating an example of a disk array apparatus.

FIG. 1 is a diagram illustrating the configuration of a disk array apparatus.

The disk array apparatus includes two control modules 1 and one disk array 3. The two control modules have the same configuration. Each of the control modules 1 includes a host control unit 11, a switch 12, a battery 13, a CPU 14, a cache memory 15, a memory control unit 16, a flash memory 17, and an expander 18.

When the two control modules are distinguished, the control modules are referred to as control modules CM#0 and CM#1. For example, the host control unit mounted on the control module CM#0 is represented as 11A, and the host control unit mounted on the control module CM#1 is represented as 11B. The same applies to the switch 12 and the like.

The disk array apparatus is connected to two servers. In other words, the control modules 1 are respectively connected to the servers corresponding thereto. The disk array apparatus receives data from the servers, and writes the data in the disk array 3 according to a write request from the servers. The disk array apparatus reads out data from the disk array 3, and transmits the data to the servers according to a read request from the servers.

This computer system or the disk array apparatus performs duplexing of data, in other words, mirroring to improve reliability of the data. In other words, this disk array apparatus is a RAID apparatus. When the two control modules 1 are distinguished, the control modules 1 are represented as, for example, control modules CM#0 and CM#1.

The host control unit 11 is connected to the server and the CPU 14, and controls data transfer between the server and the disk array apparatus. For example, the host control unit 11 receives a write request and write data from the server, and transfers the write request and the write data to the CPU 14. The "write data" is data that needs to be written in the disk array 3. The host control unit 11 receives a read request from the server, and transfers the read request to the CPU 14. Then, the host control unit 11 receives read data from the CPU 14, and transfers the read data to the server as a response to the read request. The "read data" is data that is read out from the disk array 3.

The CPU 14 controls writing of data in the cache memory 15 or the disk array 3 according to the write request received from the server. The CPU 14 controls reading of data from the cache memory 15 or the disk array 3 according to the read request received from the server.

The cache memory 15 is a volatile memory sufficiently faster than the disk array 3, for example, a semiconductor memory such as a DRAM (Dynamic Random Access Memory). The cache memory 15 is connected to the CPU 14. Write data transferred from the server or read data read out from the disk array 3 is temporarily stored in the cache memory 15. "Dirty data" is write data that is written in the cache memory 15 and not written in the disk array 3 yet.

The disk array 3 includes a plurality of magnetic disk devices 31. The disk array 3 is connected to the CPU 14 via the expander 18.

The flash memory 17 is a nonvolatile memory to save the data of the cache memory 15. As explained later, during the electric power failure of the main power supply for the disk array apparatus, all data that need to be saved among the data stored in the cache memory 15 is saved in the flash memory 17. This makes it possible to guarantee the data of the cache memory 15. The flash memory 17 only is needed to be a nonvolatile storage device. For example, a magnetic disk device or various nonvolatile semiconductor memories may be used instead of the flash memory 17.

The flash memory 17 is a nonvolatile memory sufficiently faster than the disk array 3 but slower than the cache memory 15, for example, a semiconductor memory such as an EEPROM (Electrically Erasable and Programmable Read Only Memory). The flash memory 17 is connected to the CPU 14 via the memory control unit 16. Write data transferred from the server or read data read out from the disk array 3 is temporarily stored (in other words, saved) in the flash memory 17. The memory control unit 16 executes writing or reading the flash memory 17 according to an instruction from the CPU 14.

When the CPU 14 receives the write request and the write data during operation in the "write-back state", the CPU 14 writes the write data in the cache memory 15 and then, notifies the host control unit 11 of the completion of the writing. The host control unit 11 that receives this notification notifies the server of the completion of the writing. Then, the write data stored in the cache memory 15, in other words, the dirty data is written in the disk array 3 by the CPU 14 via the expander 18.

When the CPU 14 receives the write request and the write data during operation in the "write-through state", the CPU 14 once writes the write data in the cache memory 15 and then, reads out the write data stored in the cache memory 15, and writes the write data in the disk array 3. Then, the CPU 14 notifies the host control unit 11 of the completion of the writing. The host control unit 11 that receives this notification notifies the server of the completion of the writing.

When the CPU 14 receives the read request from the server, the CPU 14 searches through the cache memory 15. When requested data (read data) exists in the cache memory 15, the CPU 14 reads out the requested read data from the cache memory 15, and transmits the read data to the host control unit 11. The host control unit 11 transmits the received read data to the server.

When the requested data does not exist in the cache memory 15, the CPU 14 reads out the requested data from the disk array 3, temporarily stores the data in the cache memory 15, reads out the data stored in the cache memory 15, and transmits the data to the host control unit 11. The host control unit 11 transmits the received data to the server.

The expander 18 is provided between the CPU 14 and the disk array 3, and controls data transfer between the CPU 14 and the disk array 3. For example, the expander 18 receives a write command and dirty data or write data from the CPU 14, and transfers the write command and the dirty data or the write data to the disk array 3. The write command is generated by the CPU 14 based on the write request. The expander 18 receives a readout command from the CPU 14, and transfers the readout command to the disk array 3. Then, the expander 18 receives read data from the disk array 3 and once transfers the read data to the cache memory 15 as a response to the readout command. The readout command is generated by the CPU 14 based on the read request.

When the disk array 3 receives the write command, the disk array 3 writes the received dirty data or write data in an address designated in the write command in the plurality of disk devices 31. When the disk array 3 receives the readout command, the disk array 3 reads out the requested data (read data) from an address designated in the readout command in the plurality of disk devices 31, and transfers the data to the CPU 14 via the expander 18.

The expander 18A of the control module CM#0 and the expander 18B of the control module CM#1 can perform writing and reading of the respective disk devices 31. This makes it possible to execute the writing and the reading of the disk array 3 even when one of the control module CM#0 and the control module CM#1 is broken.

The CPUs 14 provided in the control modules CM#0 and CM#1 are connected to each other by a mirroring path 19 and the switches 12. The switches 12 are, for example, switches in a PCI Express. The mirroring path 19 is a communication path corresponding to the PCI Express. Consequently, the CPU 14A of the control module CM#0 and the CPU 14B of the control module CM#1 are connected to each other. For example, the dirty data and the read data stored in the cache memory 15A of the control module CM#0 are subjected to mirroring, in other words, copied to the cache memory 15B of the control module CM#1. Consequently, the dirty data and the read data are duplexed.

For example, in the control module CM#0, the CPU 14A notifies the host control unit 11 of the completion of writing of the dirty data, and, after the notification, the CPU 14A transmits a copy of the dirty data to the CPU 14B of the control module CM#1. In the control module CM#1, the CPU 14B stores the received copy of the dirty data in the cache memory 15B. In the control module CM#0, the CPU 14A stores read data in the cache memory 15A, and, after the storing, the CPU 14A transmits a copy of the read data to the CPU 14B of the control module CM#1. In the control module CM#1, the CPU 14B stores a copy of the received read data in the cache memory 15B. Data transfer is performed in the same manner from the CPU 14B of the control module CM#1 to the CPU 14A of the control module CM#0.

The CPU 14 diagnoses, for example, in a diagnosis processing unit, a power supply capability of the battery 13, and diagnoses a writable area of the flash memory 17. The power supply capability of the battery 13 gradually deteriorates according to outside temperature and the number of charging of the disk array apparatus. The writable area of the flash memory 17 is an area in which data can be written, and is, therefore, a saving area of data of the cache memory 15. In the flash memory 17, since the memory is destroyed depending on limitation on the number of times of writing while the writing is repeated, the writable area gradually decreases. The size of the flash memory 17 is set larger than the size of the cache memory 15 taking into account the decrease in the writable area.

The battery 13 is, for example, an electric double layer capacitor, and is provided in the control module 1. The battery 13 may be, for example, a nickel hydrogen battery or a lithium ion battery. The battery 13 is charged by the main power supply for the disk array apparatus during normal time. When the main power supply for the disk array apparatus is failed, for example, the battery 13 supplies the electric power to the CPU 14, the cache memory 15, the memory control unit 16, and the flash memory 17, as illustrated by a dotted line surrounding the units in FIG. 1.

The CPUs 14 are connected to each other by a diagnosis path 20. The diagnosis path 20 is a communication path for communicating diagnosis results of the battery 13 and the flash memory 17 between the two CPUs 14. The diagnosis path 20 is provided separately from the mirroring path 19. Consequently, the CPU 14A of the control module CM#0 and the CPU 14B of the control module CM#1 are connected to each other. For example, a diagnosis result of the battery 13B of the control module CM#1 and a diagnosis result of the flash memory 17B are notified to the CPU 14A of the control module CM#0.

In this disk array apparatus, an apparatus state of the disk array apparatus, in other words, the write-through state or the write-back state are controlled as explained below based on the diagnosis results of the battery 13 and the flash memory 17.

In this disk array apparatus, the CPU 14A of the control module CM#0 determines whether the disk array apparatus is set in the write-back state or the write-through state. Therefore, the control module CM#0 is a master module. The control module CM#1 may be the master module.

In the following explanation, the control module CM#0 is referred to as own system and the control module CM#1 is referred to as the other system from the viewpoint of the control module CM#0. The control module CM#0 is referred to as the other system and the control module CM#1 is referred to as own system from the viewpoint of the control module CM#1.

The CPU 14A of the control module CM#0 diagnoses a battery capacity of the battery 13A of the own system and a writable area of the flash memory 17A (hereinafter, flash memory's saving area) of the own system, and determines a data saving mode for the cache memory 15A of the own system based on a diagnosis result. The CPU 14B of the control module CM#1 diagnoses a battery capacity of the battery 13B of the own system and a writable area (flash memory's saving area) of the flash memory 17B of the own system, and determines a data saving mode for the cache memory 15B of the own system based on a diagnosis result.

The CPU 14B of the control module CM#1 notifies the CPU 14A of the other system of state information of the own system via the diagnosis path 20. Consequently, for example, the CPU 14A of the control module CM#0 acquires other system state information from the CPU 14B of the control module CM#1. The other system state information from the viewpoint of the control module CM#0 is information which is decided based on the battery 13B of the control module CM#1 and the flash memory 17B of the control module CM#1, and which indicates possibility of data saving of the cache memory 15B of the control module CM#1.

Specifically, the other system state information from the viewpoint of the control module CM#0 is information indicating whether both dirty data and mirroring data in data written in the cache memory 15B of the control module CM#1 can be saved in the flash memory 17B of the control module CM#1.

The CPU 14A of the control module CM#0 determines, based on own system state information and other system state information acquired from the CPU 14B of the control module CM#1, whether the disk array apparatus is set in the write-back state or the write-through state. Own system state information from the viewpoint of the control module CM#0 is information which is decided based on the battery 13A of the control module CM#0 and the flash memory 17A of the control module CM#0, and which indicates possibility of data saving of the cache memory 15A of the control module CM#0.

Specifically, the own system state information viewed from the control module CM#0 is information indicating whether both dirty data and mirroring data in data written in the cache memory 15A of the control module CM#0 or only dirty data written in the cache memory 15A of the control module CM#0 can be saved in the flash memory 17A of the control module CM#0.

The CPU 14A of the control module CM#0 sets the disk array apparatus in the write-back state irrespective of own system state information when other system state information indicates that both the dirty data and the mirroring data written in the cache memory 15B of the control module CM#1 can be saved in the flash memory 17B of the control module CM#1.

When a battery capacity of the battery 13B of the control module CM#1 is equal to or larger than a battery capacity which can save both the dirty data and the mirroring data written in the cache memory 15B of the control module CM#1 in the flash memory 17B of the control module CM#1 and a memory capacity of the flash memory 17B of the control module CM#1 is equal to or larger than a memory capacity to which both the dirty data and the mirroring data written in the cache memory 15B of the control module CM#1 can be saved, the other system state information indicates that both the dirty data and the mirroring data written in the cache memory 15B of the control module CM#1 can be saved in the flash memory 17B of the control module CM#1.

The CPU 14A of the control module CM#0 determines a data saving range of the cache memory 15A of the control module CM#0 according to own system state information.

For example, when the own system state information indicates that both the dirty data and the mirroring data written in the cache memory 15A of the control module CM#0 can be saved in the flash memory 17A of the control module CM#0, during the electric power failure of the main power supply for the disk array apparatus, the CPU 14A of the control module CM#0 causes the battery 13A to supply electric power to the cache memory 15A, the CPU 14A, and the flash memory 17A of the control module CM#0, and saves both the dirty data and the mirroring data written in the cache memory 15A of the control module CM#0 in the flash memory 17A of the control module CM#0.

When the own system state information indicates that only the dirty data written in the cache memory 15A of the control module CM#0 may be saved in the flash memory 17A of the control module CM#0, during the electric power failure of the main power supply for the disk array apparatus, the CPU 14A of the control module CM#0 causes the battery 13A to supply electric power to the cache memory 15A, the CPU 14A, and the flash memory 17A of the control module CM#0, and saves only the dirty data written in the cache memory 15A of the control module CM#0 in the flash memory 17A of the control module CM#0.

When the own system state information indicates that the dirty data written in the cache memory 15A of the control module CM#0 cannot be saved in the flash memory 17A of the control module CM#0, during the electric power failure of the main power supply for the disk array apparatus, the CPU 14A of the control module CM#0 causes the battery 13A to supply electric power to only the cache memory 15A of the control module CM#0.

The CPU 14B of the control module CM#1 may determine an apparatus state of the disk array apparatus. One of the CPU 14A of the control module CM#0 and the CPU 14B of the control module CM#1 may determine an apparatus state of the disk array apparatus. In this case, the CPU 14A of the control module CM#0 and the CPU 14B of the control module CM#1 notify diagnosis results of the own systems each other. It is also possible that processing units that determine the data saving mode for the cache memories 15 of the own systems are provided in the respective CPU 14A of the control module CM#0 and the CPU 14B of the control module CM#1 and, separately from the processing units, a processing unit that determines an apparatus state of the disk array apparatus is provided in one of the CPU 14A of the control module CM#0 and the CPU 14B of the control module CM#1.

Figure 2:
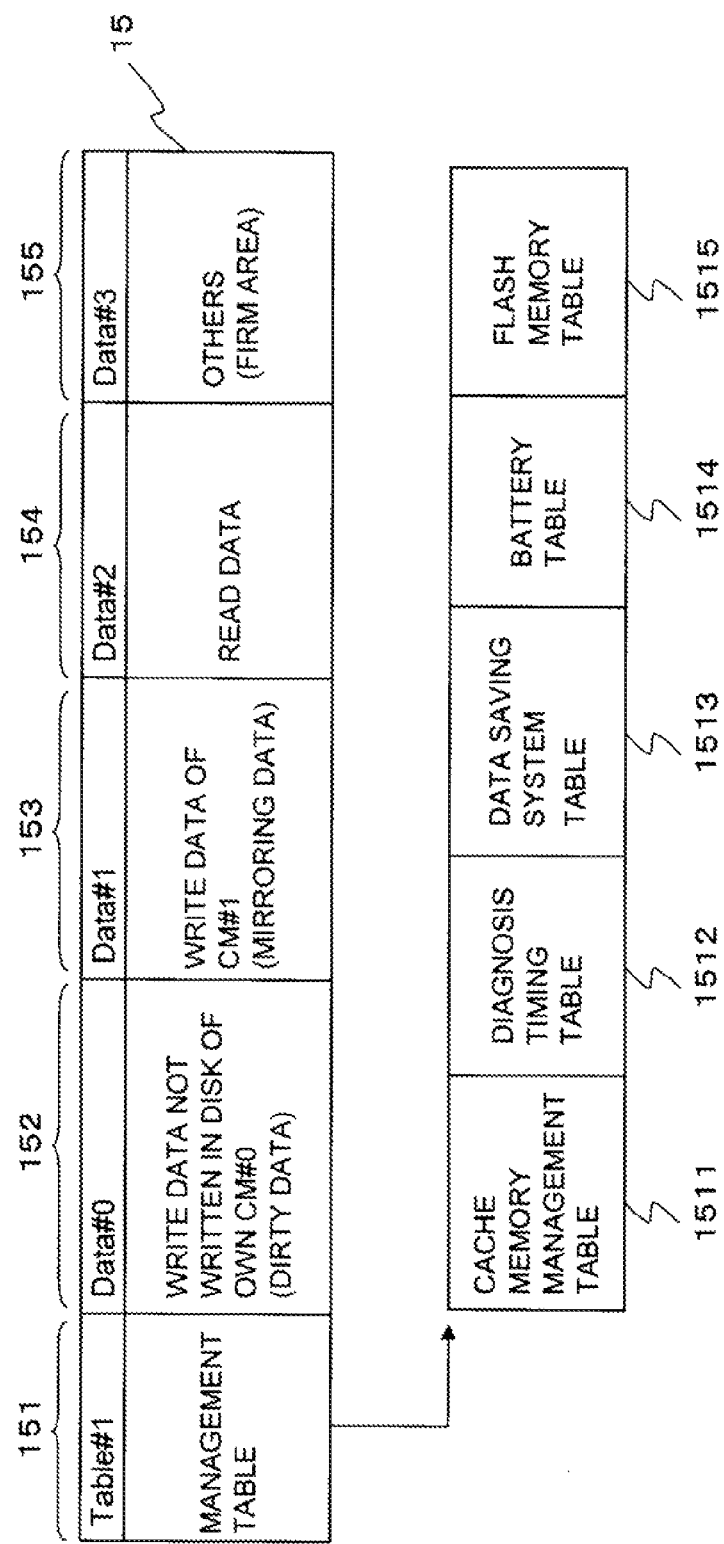
FIG. 2 is a diagram illustrating an example of a cache memory.

FIG. 2 is a diagram illustrating the structure of the cache memory 15. The cache memory 15 illustrated in FIG. 2 is the cache memory 15A of the control module CM#0.

The cache memory 15 is divided into areas 151 to 155. The area 151 is an area in which various management tables are stored. The area 152 is an area in which write data of the control module 1 (CM#0) of the own system, which is not written in the disk array 3, in other words, dirty data is stored. The area 153 is an area in which dirty data of the control module 1 (CM#1) of the other system, in other words, mirroring data is stored. The area 154 is an area in which read data of the control module 1 (CM#0) of the own system is stored. The area 155 is an area in which other data is stored, for example, a firmware area in which firmware is stored.

The dirty data stored in the area 152 is referred to as Data#0. The mirroring data stored in the area 153 is referred to as Data#1. The read data stored in the area 154 is referred to as Data#2. The data stored in the area 155 is referred to as Data#3. Data#0 is dirty data in the cache memory 15A of the control module CM#0. Data#1 is mirroring data in the cache memory 15A of the control module CM#0.

For example, the mirroring data (Data#1) in the cache memory 15A of the control module CM#0 is a copy of the dirty data of the control module CM#1. Similarly, the mirroring data in the cache memory 15B of the control module CM#1 is a copy of the dirty data (Data#0) of the control module CM#0. Therefore, the dirty data of the control module CM#1 may be referred to as "dirty data (Data#1)". The mirroring data of the control module CM#1 may be referred to as "mirroring data (Data#0)". In this example, the size of the dirty data in the control module CM#0 and the size of the dirty data in the control module CM#1 are equal.

In the cache memory 15, Data#0 is data guaranteed by being saved in the flash memory 17A during the electric power failure of the main power supply for the disk array apparatus. Since Data#1 is the mirroring data, Data#1 is data desirably guaranteed by being saved in the flash memory 17A during the electric power failure of the main power supply for the disk array apparatus.

In the area 151, a cache memory management table 1511, a diagnosis timing table 1512, a data saving mode table 1513, a battery table 1514, and a flash memory table 1515 are stored. These tables may be generally referred to as tables 1511 to 1515.

The cache memory management table 1511 is included in an OS (operating system) running on the CPU 14 of the control module 1. When the OS is started during turn-on of the main power supply for the disk array apparatus, the cache memory management table 1511 is stored in the cache memory 15 by the started OS, in other words, the CPU 14 that executes the OS. The cache memory management table 1511 stores addresses of the areas 151 to 155, in particular, addresses in which Data#0 to Data#3 are scheduled to be stored in the cache memory 15. Consequently, the areas 151 to 155 in the cache memory 15 are set. At a point when the cache memory management table 1511 is stored in the cache memory 15, a type and an address of data stored in the cache memory 15 are not stored in the cache memory management table 1511.

As explained above, the CPU 14 writes Data#0 to Data#3 in the areas 152 to 155, which are areas in which Data#0 to Data#3 are respectively stored, as illustrated in FIG. 2. The CPU 14 writes, every time data is stored in the cache memory 15, a type and an address of the stored data in the cache memory management table 1511. Consequently, the cache memory management table 1511 manages the type and the address of the data stored in the cache memory 15. As types of data, there are dirty data, mirroring data, read data, other data, and firmware.

For example, Data#0 of the area 152 actually includes a plurality of dirty data. The entire area 152 including the plurality of dirty data is transferred to the flash memory 17 as explained later. Therefore, data of the entire area 152 including the plurality of dirty data is referred to as Data#0. Data#1 of the area 153 actually includes a plurality of mirroring data. The entire area 153 including the plurality of mirroring data is transferred to the flash memory 17 as explained later. Therefore, data of the entire area 153 including the plurality of mirroring data is referred to as Data#1.

During the electric power failure of the main power supply for the disk array apparatus, as explained later with reference to FIG. 5 and FIGS. 6A and 6B, the CPU 14 controls the battery 13 to supply electric power to a range set in advance including the cache memory 15. In addition, when data of the cache memory 15 is saved in the flash memory 17, the CPU 14 transfers Data#0 or Data#0 and Data#1 from the cache memory 15 to the flash memory 17, referring to the cache memory management table 1511.

The diagnosis timing table 1512 is included in the OS running on the CPU 14 of the control module 1. When the OS is started during turn-on of the main power supply of the disk array apparatus, the diagnosis timing table 1512 is stored in the cache memory 15 by the CPU 14 that executes the OS. The diagnosis timing table 1512 sets diagnosis timing for a diagnosis item. At a point when the diagnosis timing table 1512 is stored in the cache memory 15, only diagnosis timing is stored and a diagnosis result is not stored in the diagnosis timing table 1512. The diagnosis timing table 1512 is explained later with reference to FIG. 3.

The data saving mode table 1513 is included in the OS running on the CPU 14 of the control module 1. When the OS is started during turn-on of the main power supply for the disk array apparatus, the data saving mode table 1513 is stored in the cache memory 15 by the CPU 14 that executes the OS.

The data saving mode table 1513 sets an apparatus state of the disk array apparatus to correspond to a combination of a plurality of diagnosis results. The apparatus state of the disk array apparatus indicates distinction whether the disk array apparatus is set in the write-back state or the write-through state. The apparatus state of the disk array apparatus is set to correspond to a combination of a diagnosis result of the battery 13 and a diagnosis result of the flash memory 17 in the control module 1 of the own system and a diagnosis result of the battery 13 and a diagnosis result of the flash memory 17 in the control module 1 of the other system. The data saving mode table 1513 is explained later with reference to FIGS. 4 and 5.

The battery table 1514 is included in the OS running on the CPU 14 of the control module 1. When the OS is started during turn-on of the main power supply for the disk array apparatus, the battery table 1514 is stored in the cache memory 15 by the CPU 14 that executes the OS. The battery table 1514 stores a battery capacity with respect to a data amount saved from the cache memory 15. In other words, the battery table 1514 stores a battery capacity necessary in saving data that is saved from the cache memory 15. Consequently, when a battery capacity is calculated, time for discharge from the battery 13 is set and a data amount that can be saved in the discharge time is calculated.

During the electric power failure of the main power supply for the disk array apparatus, the CPU 14 refers to the battery table 1514 using a diagnosis result of the battery capacity. By referring to the battery table 1514, the CPU 14 determines that it is possible to save Data#0 and Data#1 of the cache memory 15 in the flash memory 17 using the battery 13. Specifically, the CPU 14 refers to the battery table 1514 using the diagnosis result of the battery capacity, calculates a data amount that can be saved from the cache memory 15 according to the battery capacity, and determines whether the data amount that can be saved is larger than Data#0 or (Data#0+Data#1).

The flash memory table 1515 is included in the OS running on the CPU 14 of the control module 1. When the OS is started during turn-on of the main power supply of the disk array apparatus, the flash memory table 1515 is stored in the cache memory 15 by the CPU 14 that executes the OS. The flash memory table 1515 stores the size of a saving area of the flash memory 17 necessary for storing a data amount saved from the cache memory 15. Consequently, when a flash memory's saving area is calculated, a data amount that can be saved from the cache memory 15 is calculated.

During the electric power failure of the main power supply for the disk array apparatus, the CPU 14 refers to the flash memory table 1515 using a diagnosis result of the flash memory's saving area. By referring to the flash memory table, the CPU 14 determines whether Data#0 and Data#1 of the cache memory 15 can be saved in the flash memory 17. Specifically, the CPU 14 refers to the flash memory table 1515 using the diagnosis result of the flash memory's saving area, calculates a data amount that can be written in the flash memory 17, in other words, a data amount that can be saved from the cache memory 15, and determines whether the data amount that can be saved is larger than Data#0 or (Data#0+Data#1).

The tables 1511 to 1515 may be provided as firmware in a host computer of the control module 1 separately provided from the control module 1.

Figure 3:
FIG. 3 is a diagram illustrating an example of a diagnosis timing table.

FIG. 3 illustrates an example of the diagnosis timing table 1512.

In this example, the size of the dirty data (Data#0) is fixed as illustrated in FIG. 3. As illustrated in FIG. 2, the size of the area 152 is the size of the dirty data (Data#0). Therefore, as explained above, the size of the dirty data is generated by the CPU 14 during the start of the disk array apparatus or in every diagnosis based on an address of the area 152 and an address of the area 153 stored by the cache memory management table 1511. The generated size of the dirty data is stored in, for example, the cache memory management table 1511, for example, until the next diagnosis.

The battery capacity is a power supply capability of the battery 13. As explained above, the battery capacity gradually deteriorate. Therefore, for example, as illustrated in FIG. 3, the battery capacity is diagnosed during the start of the disk array apparatus, during restoration from the electric power failure of the main power supply for the disk array apparatus (hereinafter referred to as power recovery), or once a week. A diagnosis result of the battery capacity is stored in the diagnosis timing table 1512, for example, until the next diagnosis of a battery capacity.

The flash memory's saving area is an area in which data of the cache memory 15 can be written. As explained above, the flash memory's saving area gradually decreases. Therefore, as illustrated in FIG. 3, the flash memory's saving area is diagnosed, for example, during the start or during power recovery of the disk array apparatus. This is because destruction of a memory cell of the flash memory 17 occurs only during reading of data, in other words, during saving of data from the cache memory 15. A diagnosis result of the flash memory's saving area is stored in the diagnosis timing table 1512, for example, until the next diagnosis of the flash memory's saving area.

A diagnosis result of the other system control module (CM) is a diagnosis result notified to one control module 1 (CM#0) from the other control module 1 (CM#1), in other words, other system state information. The diagnosis result of the other system control module is stored every time the control module 1 receives a diagnosis result from the control module 1 of the other system. For example, in the diagnosis timing table 1512 of the control module CM#0, state information of the control module CM#1, in other words, information indicating whether a state of the control module CM#1 is "all Write data possible".

Figure 9:
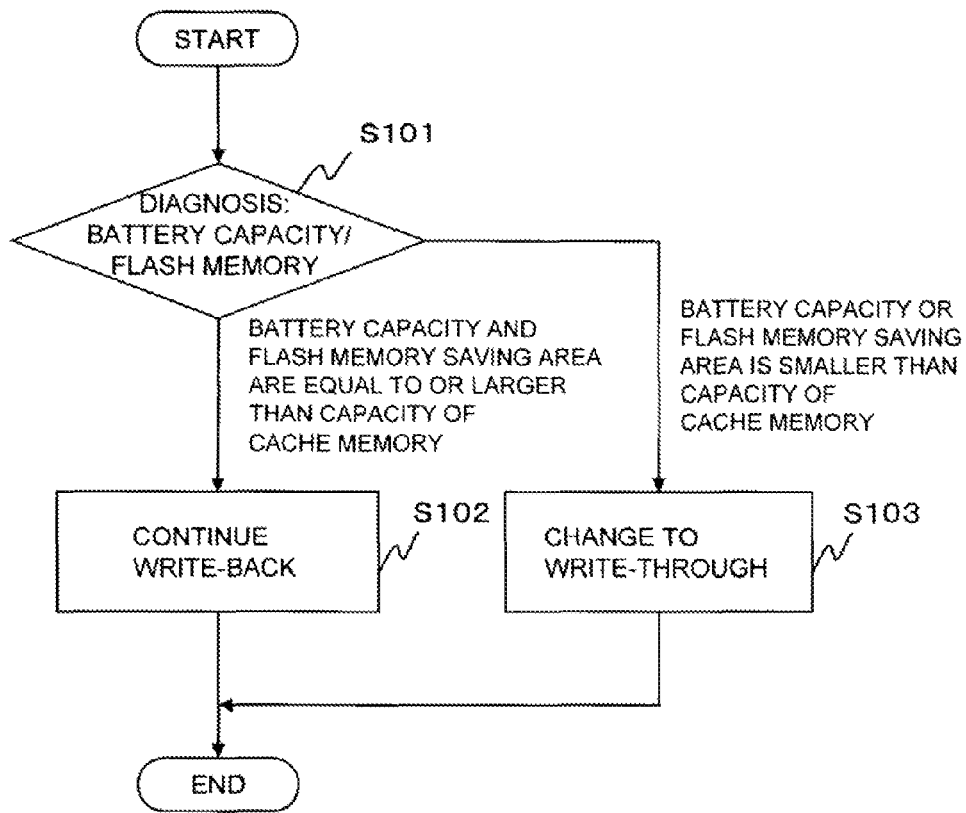
FIG. 9 is a diagnosis processing flowchart of data saving, which is examined as a background us.

FIG. 4 illustrates an example of the data saving mode table 1513 and illustrates, in particular, the data saving mode table 1513 in the control module CM#0. In FIG. 4, an apparatus state of the disk array apparatus according to a system illustrated in FIG. 9 is illustrated for comparison.

In FIG. 4, the data saving mode table 1513 stores a battery capacity, a flash memory's saving area, a data saving mode for own system, an other system state, and an apparatus state. The battery capacity is information indicating a range in which the capacity of the battery 13A in the control module CM#0 of the own system can save data stored in the cache memory 15A. The flash memory's saving area is information indicating a range in which the flash memory's saving area of the flash memory 17A in the control module CM#0 of the own system can save data stored in the cache memory 15A. Therefore, the range in which the data stored in the cache memory 15A can be saved is set based on the battery capacity and the flash memory's saving area. The data saving mode for own system is information indicating the data saving mode in the control module CM#0 of the own system. The other system state is state information indicating a state of the control module CM#1 of the other system, and is, specifically, information indicating whether all Write data can be saved in the control module CM#1 of the other system. The apparatus state is information indicating whether the operation of the disk array apparatus is in the write-back state or the write-through state.

As explained above, the CPU 14A of the control module CM#0 calculates a battery capacity and a flash memory's saving area through diagnosis of the own system, and obtains the data saving mode for own system corresponding to the calculated battery capacity and flash memory's saving area from the data saving mode table 1513. Further, as explained above, the CPU 14A of the control module CM#0 acquires an other system state as state information of the control module CM#1 of the other system, and obtains an apparatus state corresponding to the acquired other system state and the obtained data saving mode for the own system from the data saving mode table 1513.

In FIG. 4, a case No. 1 is a case in which the battery capacity is "all Write data possible" and the flash memory's saving area is "all Write data possible" in the control module CM#0 of the own system, and the state of the control module CM#1 of the other system is "all Write data possible".

When the battery capacity is "all Write data possible", in the control module CM#0, this indicates that the capacity of the battery 13A is equal to or larger than a battery capacity which can save all data (all Write data) that need to be saved of the cache memory 15A. "All Write data" is a sum of Data#0 and Data#1 illustrated in FIG. 2, and is represented as "Data#0+#1".

When the flash memory's saving area is "all Write data possible", in the control module CM#0, this indicates that a data writable area in the flash memory 17A is equal to or larger than a memory capacity to which the all Write data can be saved.

When the state of the control module CM#1 of the other system is "all Write data possible", in the control module CM#1, this indicates that the capacity of the battery 13B is equal to or larger than a battery capacity which can save the all Write data, and that a data writable area in the flash memory 17B is equal to or larger than a memory capacity to which the all Write data can be saved. Therefore, as a result, when the state of the control module CM#1 of the other system is "all Write data possible", in the control module CM#1, this indicates that the all Write data (Data#0+#1) of the cache memory 15B can be saved in the flash memory 17B.

In this way, the case No. 1 is a case in which, in the control module CM#0, the all Write data (Data#0+#1) of the cache memory 15A can be saved in the flash memory 17A, and, in the control module CM#1, the all Write data (Data#0+#1) of the cache memory 15B can be saved in the flash memory 17B.

Therefore, in the case No. 1, the data saving mode for the cache memory 15A in the control module CM#0 is "all Write data Destage". In this way, the data saving mode is determined from the "battery capacity" and the "flash memory's saving area". "All Write data Destage" means that the all Write data (Data#0+#1) is saved (destaged) in the flash memory 17. Consequently, the all Write data (Data#0+#1) is guaranteed.

As a result, in the case No. 1, both the dirty data and the mirroring data are guaranteed in both the control module CM#0 and the control module CM#1. Accordingly, in the case No. 1, the disk array apparatus is set in the write-back state. In this way, an "apparatus state" of the disk array apparatus is determined from the "own system data saving mode" and the "other system state".

A case No. 2 is a case in which the battery capacity is "all Write data possible" and the flash memory's saving area is "all Write data possible" in the control module CM#0 of the own system, and the state of the control module CM#1 of the other system is "all Write data impossible".

When the state of the control module CM#1 of the other system is "all Write data impossible", in the control module CM#1, this indicates any one of that the capacity of the battery 13B is smaller than a battery capacity which can save the all Write data, or that the data writable area in the flash memory 17B is smaller than a memory capacity to which the all Write data can be saved. Therefore, as a result, when the state of the control module CM#1 of the other system is "all Write data impossible", in the control module CM#1, this indicates that the all Write data (Data#0+#1) of the cache memory 15B cannot be saved in the flash memory 17B.

In this way, the case No. 2 is a case in which, in the control module CM#0, the all Write data (Data#0+#1) of the cache memory 15A cannot be saved in the flash memory 17A, and, in the control module CM#1, the all Write data (Data#0+#1) of the cache memory 15B cannot be saved in the flash memory 17B.

Therefore, in the case No. 2, the data saving mode for the cache memory 15A in the control module CM#0 is "all Write data Destage". Consequently, in the case No. 2, in the control module CM#0, the dirty data (Data#0) and the mirroring data (Data#1) are guaranteed.

On the other hand, in the control module CM#1, the dirty data (Data#1) cannot be saved in the flash memory 17B. However, the mirroring data (Data#1) in the control module CM#0 is a copy of the dirty data (Data#1) of the control module CM#1. Therefore, it can be considered that the dirty data (Data#1) of the control module CM#1 is saved in the flash memory 17A of the control module CM#0 and guaranteed. Accordingly, in the case No. 2, the disk array apparatus is set in the write-back state.

In this way, in the disk array apparatus illustrated in FIG. 1, when both the dirty data of the control module CM#0 and the dirty data of the control module CM#1 can be saved, the write-back state can be maintained. A saving destination of the dirty data may be any destination. In other words, when the dirty data of the other system is saved, an apparatus state of the disk array apparatus is determined assuming that the dirty data of own system is saved.

A case No. 3 is a case in which the battery capacity is "all Write data possible" but the flash memory's saving area is "own system Write data possible" in the control module CM#0 of the own system, and the state of the control module CM#1 of the other system is "all Write data possible".

When the flash memory's saving area is "own system Write data possible", in the control module CM#0, this indicates that the data writable area in the flash memory 17A is equal to or larger than the memory capacity to which the own Write data can be saved. "Own Write data" is Data#0 illustrated in FIG. 2, in other words, the dirty data.

In this way, the case No. 3 is a case in which, in the control module CM#0, the own Write data (Data#0) of the cache memory 15A can be saved in the flash memory 17A, and, in the control module CM#1, the all Write data (Data#0+#1) of the cache memory 15B can be saved in the flash memory 17B.

Therefore, in the case No. 3, the data saving mode for the cache memory 15A in the control module CM#0 is "own system Write data Destage". "Own system Write data Destage" means that the own Write data (Data#0 is saved (destaged) in the flash memory 17. Consequently, in the case No. 3, in the control module CM#0, the dirty data (Data#0) is guaranteed.

As explained above, in cache Destate, there are two modes "all Write data Destage" and "own system Write data Destage". During the electric power failure of the main power supply for the disk array apparatus, power supply ranges in both the modes are the same. However, ranges of data saved from the cache memory 15 are different in the modes. Specifically, in "All Write data Destage", the all Write data (Data#0+#1) is saved in the flash memory 17. On the other hand, in "own system Write data Destage", the own system Write data (Data #0) is saved in the flash memory 17.

On the other hand, in the control module CM#1, the dirty data (Data#1) can be saved in the flash memory 17B. Accordingly, in the case No. 3, the disk array apparatus is set in the write-back state.

A case No. 4 is a case in which the battery capacity is "all Write data possible" but the flash memory's saving area is "own system Write data possible" in the control module CM#0 of the own system, and the state of the control module CM#1 of the other system is "all Write data impossible".

In this way, the case No. 4 is a case in which, in the control module CM#0, the own system Write data (Data#0) of the cache memory 15A can be saved in the flash memory 17A, and, in the control module CM#1, the all Write data (Data#0+#1) of the cache memory 15B cannot be saved in the flash memory 17B.

Therefore, in the case No. 4, the data saving mode for the cache memory 15A in the control module CM#0 is "own system Write data Destage". Consequently, in the case No. 4, in the control module CM#0, only the dirty data (Data#0) is guaranteed.

On the other hand, in the control module CM#1, the dirty data (Data#1) and the mirroring data (Data#0) cannot be saved in the flash memory 17B. Therefore, the dirty data (Data#1) of the control module CM#1 is not guaranteed in both the control modules CM#0 and CM#1. Accordingly, in the case No. 4, the disk array apparatus is set in the write-through state.

A case No. 5 is a case in which the battery capacity is "all Write data possible" but the flash memory's saving area is "BackUp impossible" in the control module CM#0 of the own system, and the state of the control module CM#1 of the other system is "all Write data possible".

When the flash memory's saving area is "BackUp impossible", in the control module CM#0, this indicates that the data writable area in the flash memory 17A is smaller than a memory capacity to which the own system Write data (Data#0) can be saved.

In this way, the case No. 5 is a case in which, in the control module CM#0, the own system Write data (Data#0) of the cache memory 15A cannot be saved in the flash memory 17, and, in the control module CM#1, the all Write data (Data#0+ #1) of the cache memory 15B can be saved in the flash memory 17B. The mirroring data (Data#1) of the cache memory 15A cannot be saved in the flash memory 17A either.

Therefore, in the case No. 5, the data saving mode for the cache memory 15A in the control module CM#0 is "cache BackUp". "cache BackUp" means that the all Write data (Data#0+#1) is not actually saved (destaged) in the flash memory 17 but is kept stored in the cache memory 15A. Consequently, in the case No. 5, in the control module CM#0, the dirty data (Data#0) is not guaranteed. In other words, the data stored in the cache memory 15A is maintained in a period in which electric power is supplied from the battery 13A to the cache memory 15A during the electric power failure of the power supply for the disk array apparatus. However, the data disappears when electric power stops being supplied.

On the other hand, in the control module CM#1, the mirroring data (Data#0) can be saved in the flash memory 17B. In other words, the dirty data (Data#0) of the control module CM#0 is guaranteed by the flash memory 17B of the control module CM#1. Accordingly, in the case No. 5, the disk array apparatus is set in the write-back state.

A case No. 6 is a case in which the battery capacity is "all Write data possible" but the flash memory's saving area is "BackUp impossible" in the control module CM#0 of the own system, and the state of the control module CM#1 of the other system is "all Write data impossible".

In this way, the case No. 6 is a case in which, in the control module CM#0, the own system Write data (Data#0) of the cache memory 15A can be saved in the flash memory 17A, and, in the control module CM#1, the all Write data (Data#0+ #1) of the cache memory 15B cannot be saved in the flash memory 17B. The mirroring data (Data#1) of the cache memory 15A cannot be saved in the flash memory 17A either.

Therefore, in the case No. 6, the data saving mode for the cache memory 15A in the control module CM#0 is "cache BackUp". Consequently, in the case No. 6, in the control module CM#0, the dirty data (Data#0) is not guaranteed.

On the other hand, in the control module CM#1, the dirty data (Data#1) and the mirroring data (Data#0) cannot be saved in the flash memory 17B. Therefore, the dirty data of the control module CM#0 and the dirty data of the control module CM#1 are not guaranteed in both the control modules CM#0 and CM#1. Accordingly, in the case No. 6, the disk array apparatus is set in the write-through state.

A case No. 7 is a case in which the battery capacity is "own system Write data possible" and the flash memory's saving area is "all Write data possible" in the control module CM#0 of the own system, and the state of the control module CM#1 of the other system is "all Write data possible".

When the battery capacity is "own system Write data possible", in the control module CM#0, this indicates that the capacity of the battery 13A is equal to or larger than a battery capacity which can save the own system Write data (Data#0).

In this case, the case No. 7 is a case in which, in the control module CM#0, the own system Write data (Data#0) of the cache memory 15A can be saved in the flash memory 17A, and, in the control module CM#1, the all Write data (Data#0+ #1) of the cache memory 15B can be saved in the flash memory 17B.

Therefore, in the case No. 7, the data saving mode for the cache memory 15A in the control module CM#0 is "own system Write data Destage". Consequently, in the control module CM#0, only the dirty data (Data#0) is guaranteed.

On the other hand, in the control module CM#1, the dirty data (Data#1) can be saved in the flash memory 17B. Accordingly, in the case No. 7, the disk array apparatus is set in the write-back state.

A case No. 8 is a case in which the battery capacity is "own system Write data possible" and the flash memory's saving area is "all Write data possible" in the control module CM#0 of the own system but the state of the control module CM#1 of the other system is "all Write data impossible".

In this way, the case No. 8 is a case in which, in the control module CM#0, the own system Write data (Data#0) of the cache memory 15A can be saved in the flash memory 17A, and, in the control module CM#1, the all Write data (Data #0+#1) of the cache memory 15B cannot be saved in the flash memory 17B.

Therefore, in the case No. 8, the data saving mode of the cache memory 15A in the control module CM#0 is "own system Write data Destage". Consequently, in the case No. 8, in the control module CM#0, the dirty data (Data#0) is guaranteed.

On the other hand, in the control module CM#1, the dirty data (Data#1) and the mirroring data (Data#0) cannot be saved in the flash memory 17B. Therefore, the dirty data (Data#1) of the control module CM#1 is not guaranteed in both the control modules CM#0 and CM#1. Accordingly, in the case No. 8, the disk array apparatus is set in the write-through state.

A case No. 9 is a case in which the battery capacity is "own system Write data possible" but the flash memory's saving area is "own system Write data possible" in the control module CM#0 of the own system, and the state of the control module CM#1 of the other system is "all Write data possible".

In this way, the case No. 9 is a case in which, in the control module CM#0, the own system Write data (Data#0) of the cache memory 15A can be saved in the flash memory 17A, and, in the control module CM#1, the all Write data (Data#0+ #1) of the cache memory 15B can be saved in the flash memory 17B.

Therefore, in the case No. 9, the data saving mode for the cache memory 15A in the control module CM#0 is "own system Write data Destage". Consequently, in the case No. 9, in the control module CM#0, only the dirty data (Data#0) is guaranteed.

On the other hand, in the control module CM#1, the dirty data (Data#1) can be saved in the flash memory 17B. Accordingly, in the case No. 9, the disk array apparatus is set in the write-back state.

A case No. 10 is a case in which the battery capacity is "own system Write data possible" but the flash memory's saving area is "own Write data possible" in the control module CM#0 of the own system, and the state of the control module CM#1 of the other system is "all Write data impossible".

In this way, the case No. 10 is a case in which, in the control module CM#0, the own Write data (Data#0) of the cache memory 15A can be saved in the flash memory 17A, and, in the control module CM#1, the all Write data (data#0+#1) of the cache memory 15B cannot be saved in the flash memory 17B.

Therefore, in the case No. 10, the data saving mode for the cache memory 15A in the control module CM#0 is "own system Write data Destage". Consequently, in the case No. 10, in the control module CM#0, only the dirty data (Data#0) is guaranteed.

On the other hand, in the control module CM#1, the dirty data (Data#1) and the mirroring data (Data#0) cannot be saved in the flash memory 17B. Therefore, the dirty data (Data#1) of the control module CM#1 is not guaranteed in both the control modules CM#0 and CM#1. Accordingly, in the case No. 10, the disk array apparatus is set in the write-through state.

A case No. 11 is a case in which the battery capacity is "own system Write data possible" but the flash memory's saving area is "BackUp impossible" in the control module CM#0 of the own system, and the state of the control module CM#1 of the other system is "all Write data possible".

In this way, the case No. 11 is a case in which, in the control module CM#0, the own system Write data (Data#0) of the cache memory 15A cannot be saved in the flash memory 17A, and, in the control module CM#1, the all Write data (Data#0+#1) of the cache memory 15B can be saved in the flash memory 17B. The mirroring data (Data#1) of the cache memory 15A cannot be saved in the flash memory 17A either.

Therefore, in the case No. 11, the data saving mode for the cache memory 15A in the control module CM#0 is "cache BackUp". Consequently, in the case No. 11, in the control module CM#0, the dirty data (Data#0) is not guaranteed.

On the other hand, in the control module CM#1, the mirroring data (Data#0) can be saved in the flash memory 17B. In other words, the dirty data (Data#0) of the control module CM#0 is guaranteed by the flash memory 17B of the control module CM#1. Accordingly, in the case No. 11, the disk array apparatus is set in the write-back state.

A case No. 12 is a case in which the battery capacity is "own system Write data possible" but the flash memory's saving area is "BackUp impossible" in the control module CM#0 of the own system, and the state of the control module CM#1 of the other system is "all Write data impossible".

In this way, the case No. 12 is a case in which, in the control module CM#0, the own system Write data (Data#0) of the cache memory 15A cannot be saved in the flash memory 17A, and, in the control module CM#1, the all Write data (Data#0+#1) of the cache memory 15B cannot be saved in the flash memory 17B. The mirroring data (Data#1) of the cache memory 15A cannot be saved in the flash memory 17A either.

Therefore, in the case No. 12, the data saving mode of the cache memory 15A in the control module CM#0 is "cache BackUp". Consequently, in the case No. 12, in the control module CM#0, the dirty data (Data#0) is not guaranteed.

On the other hand, in the control module CM#1, the dirty data (Data#1) and the mirroring data (Data#0) cannot be saved in the flash memory 17B. Therefore, the dirty data of the control module CM#0 and the dirty data of the control module CM#1 are not guaranteed in both the control modules CM#0 and CM#1. Accordingly, in the case No. 12, the disk array apparatus is set in the write-through state.

A case No. 13 is a case in which the battery capacity is "BackUp impossible" and the flash memory's saving area is any one of "all Write data possible", "own system Write data possible", or "BackUp impossible" in the control module CM#0 of the own system, and the state of the control module CM#1 of the other system is "all Write data possible".

When the battery capacity is "BackUp impossible", in the control module CM#0, this indicates that the capacity of the battery 13A is smaller than a battery capacity which can save the own system Write data (Data#0).

In this way, the case No. 13 is a case in which, in the control module CM#0, the own system Write data (Data#0) of the cache memory 15A cannot be saved in the flash memory 17A, and, in the control module CM#1, the all Write data (Data#0+#1) of the cache memory 15B can be saved in the flash memory 17B.

Therefore, in the case No. 13, the data saving mode of the cache memory 15A in the control module CM#0 is "cache BackUp". Consequently, in the case No. 13, in the control module CM#0, the dirty data (Data#0) is not guaranteed.

On the other hand, in the control module CM#1, the mirroring data (Data#0) can be saved in the flash memory 17B. In other words, the dirty data (Data#0) of the control module CM#0 is guaranteed by the flash memory 17B of the control module CM#1. Accordingly, in the case No. 13, the disk array apparatus is set in the write back state.

A case No. 14 is a case in which the battery capacity is "BackUp impossible" and the flash memory's saving area is "all Write data possible", "own system Write data possible", or "BackUp impossible" in the control module CM#0 of the own system, and the state of the control module CM#1 of the other system is "all Write data impossible".

In this way, the case No. 14 is a case in which, in the control module CM#0, the own system Write data (Data#0) of the cache memory 15A cannot be saved in the flash memory 17A, and, in the control module CM#1, the all Write data (Data#0+#1) of the cache memory 15B cannot be saved in the flash memory 17B. The mirroring data (Data#1) of the cache memory 15A cannot be saved in the flash memory 17A either.

Therefore, in the case No. 14, the data saving mode of the cache memory 15A in the control module CM#0 is "cache BackUp". Consequently, in the case No. 14, the dirty data (Data#0) is not guaranteed in the control module CM#0.

On the other hand, in the control module CM#1, the dirty data (Data#1) and the mirroring data (Data#0) cannot be saved in the flash memory 17B. Therefore, the dirty data of the control module CM#0 and the dirty data of the control module CM#1 are not guaranteed in both the control modules CM#0 and CM#1. Accordingly, in the case No. 14, the disk array apparatus is set in the write-through state.

FIG. 5 illustrates an example of the data saving mode table 1513 and illustrates, in particular, the data saving mode table 1513 in the control module CM#1.

As it is seen when FIG. 4 and FIG. 5 are compared, the data saving mode table 1513 in the control module CM#1 basically has the same structure as the data saving mode table 1513 in the control module CM#0. However, as explained above, the CPU 14B of the control module CM#1 does not determine an apparatus state of the disk array apparatus. Therefore, the data saving mode table 1513 in the control module CM#1 has a structure obtained by reducing the "state of the control module CM#1 of the other system" and the "apparatus state" from the data saving mode table 1513 in the control module CM#0.

The CPU 14B of the control module CM#1 stores, separately from the data saving mode table 1513, the "apparatus state" notified from the CPU 14A of the control module CM#0.

Figure 6A:
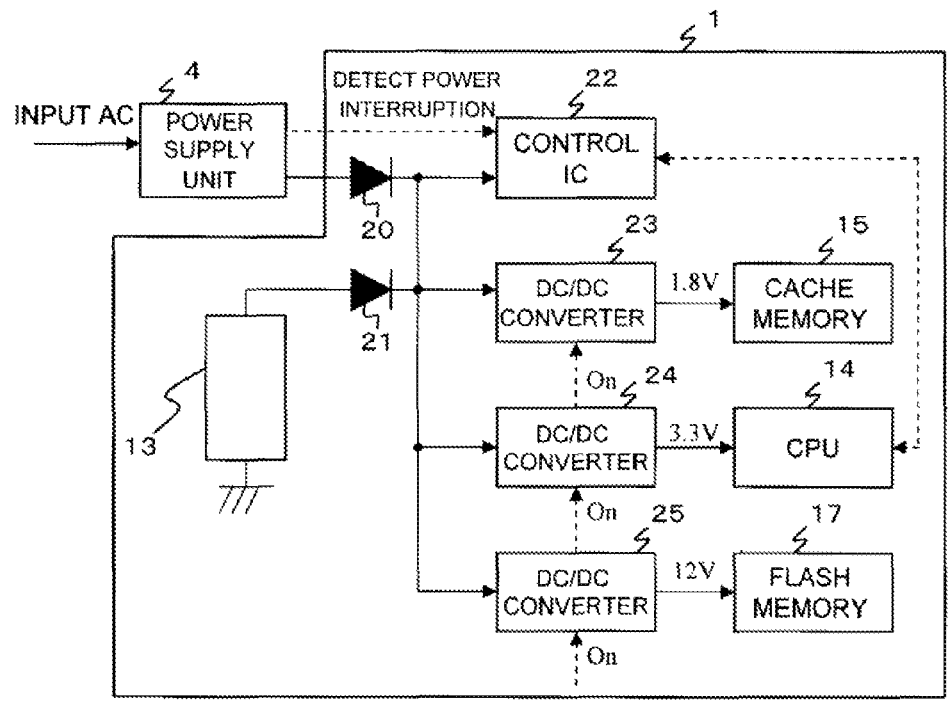
FIGS. 6A and 6B are explanatory diagrams of a data saving mode.
Figure 6B:
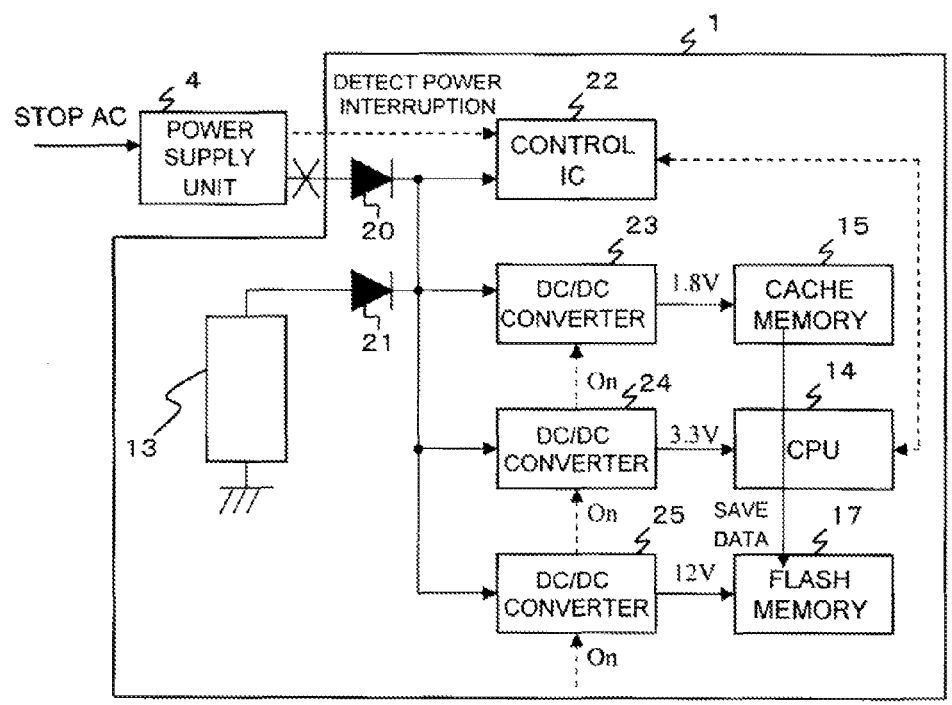
Figure 7A:
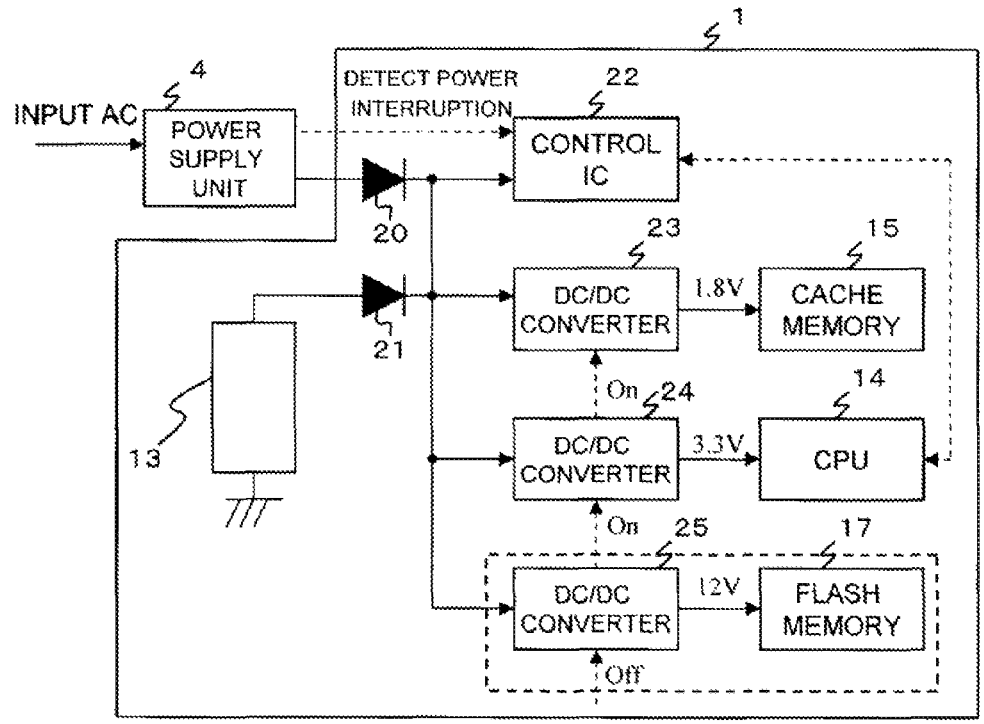
FIGS. 7A and 7B are explanatory diagrams of a data saving mode.
Figure 7B:
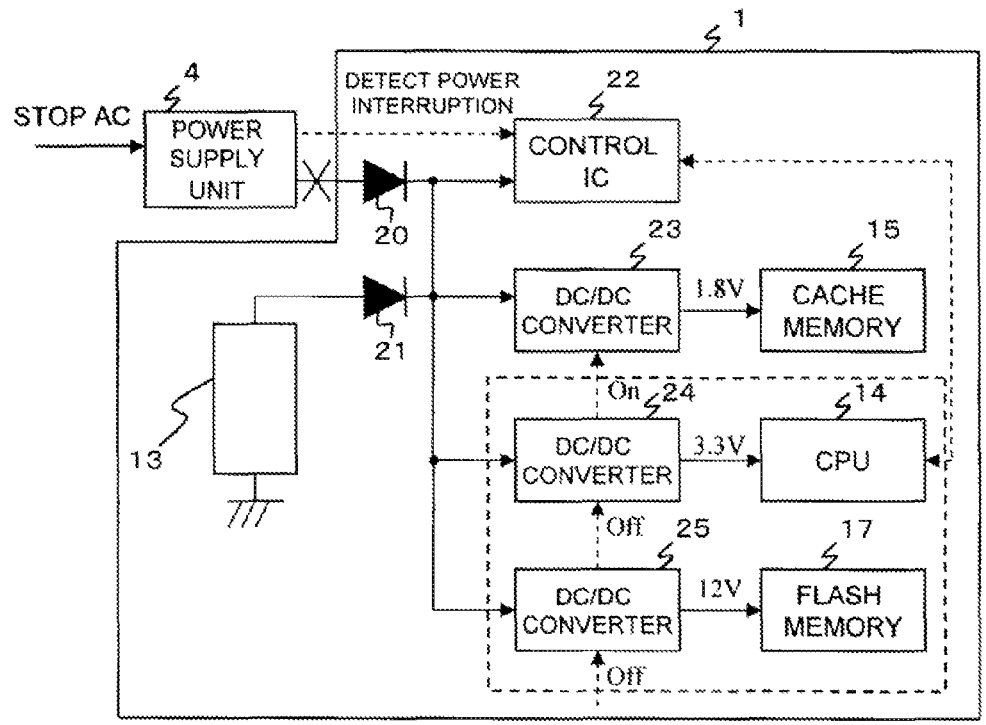

FIGS. 6A, 6B, 7A and 7B are explanatory diagrams of data saving modes. In particular, FIGS. 6A and 6B illustrate the data saving mode by the all Write data Destage (or the own system Write data Destage) and FIGS. 7A and 7B illustrate the data saving mode by the cache BackUp. The data saving mode by the all Write data Destage and the data saving mode by the cache BackUp are alternatively selected.

In FIGS. 6A and 6B and FIGS. 7A and 7B, to illustrate the data saving mode for the cache memory 15, the host control unit 11, the switch 12, and the expander 18 are not illustrated. It is assumed that the memory control unit 16 is included in the flash memory 17.

FIG. 6A illustrates a power supply range in the case in which electric power is supplied from the main power supply for the disk array apparatus in the data saving mode by the all Write data Destage. In this case, DC/DC converters 23 to 25 are turned on, whereby electric power is supplied from the main power supply for the disk array apparatus to the cache memory 15, the CPU 14, and the flash memory 17 of the control module 1 via a power supply unit 4.

An alternating-current power supply AC as the main power supply for the disk array apparatus is input to the power supply unit 4. For example, one power supply unit 4 is provided in the disk array apparatus separately from the control module 1. The power supply unit 4 generates a direct-current power supply from the alternating-current power supply AC, and inputs the direct-current power supply to a control IC 22 and to the DC/DC converters 23 to 25 via a diode 20 for reverse-current prevention.

The control IC 22 detects the electric power failure of the main power supply for the disk array apparatus in the power supply unit 4, and notifies the electric power failure to the CPU 14. The control IC 22 is provided in each of the control modules 1.

The DC/DC converters 23 to 25 generate direct-current power supplies set in advance from the direct-current power supply input from the power supply unit 4, and supply the direct-current power supplies to the cache memory 15, the CPU 14, and the flash memory 17 respectively corresponding to the DC/DC converters 23 to 25. ON and OFF of the DC/DC converters 23 to 25 is controlled by the CPU 14. "On" illustrated in the figure indicates an instruction for turning on the DC/DC converters 23 to 25 from the CPU 14.

The battery 13 is connected to the DC/DC converters 23 to 25 via a diode 21 for revere-current prevention. The battery 13 is changed, for example, by the direct-current power supply generated by the power supply unit 4.

FIG. 6B illustrates a power supply range in the case in which the main power supply for the disk array apparatus is failed in the data saving mode by the all Write data Destage. In this case, the DC/DC converters 23 to 25 are turned on, whereby electric power is supplied from the main power supply for the disk array apparatus to the cache memory 15, the CPU 14, and the flash memory 17 via the power supply unit 4. Therefore, from the viewpoint of data saving from the cache memory 15, even when the main power supply for the disk array apparatus is failed, electric power is supplied to a range same as a range of the supply of electric power from the main power supply for the disk array apparatus.

In the case of data saving by the all Write data Destage, electric power is supplied not only to the cache memory 15 but also to the flash memory 17. Therefore, data of the cache memory 15 is saved in the flash memory 17. Consequently, since the data of the cache memory 15 is saved in the non-volatile flash memory 17, even when the main power supply for the disk array apparatus is failed for a long time, the data stored by the cache memory 15 is not lost. Therefore, the disk array apparatus is set in the write back state.

As explained above, in the data saving mode by the all Write data Destage, the CPU 14 turns on the DC/DC converters 23 to 25 irrespective of the electric power failure of the main power supply for the disk array apparatus. When the CPU 14 receives a notification, which notifies a detection of the electric power failure of the main power supply for the disk array apparatus, from the control IC 22, the CPU 14 saves the data of the cache memory 15 in the flash memory 17.

FIG. 7A illustrates a power supply range in the case in which electric power is supplied from the main power supply for the disk array apparatus in the data saving mode by the cache BackUp. In this case, the DC/DC converters 23 and 24 are turned on, whereby electric power is supplied from the main power supply for the disk array apparatus to the cache memory 15 and the CPU 14 via the power supply unit 4. On the other hand, as indicated by a dotted line surrounding the flash memory 17 and the DC/DC converter 25 in FIG. 7A, the DC/DC converter 25 is turned off, whereby power supply is not supplied to the flash memory 17.

FIG. 7B illustrates a power supply range in the case in which the main power supply for the disk array apparatus is failed in the data saving mode by the cache BackUp. In this case, the DC/DC converter 23 is turned on, whereby electric power is supplied from the main power supply for the disk array apparatus to the cache memory 15 via the power supply unit 4. On the other hand, as indicated by a dotted line surrounding the CPU 14, the flash memory 17, and the DC/DC converters 24 and 25 in FIG. 7B, the DC/DC converters 24 and 25 are turned off, whereby electric power is not supplied to the CPU 14 and the flash memory 17. Therefore, when the main power supply for the disk array apparatus is failed, from the viewpoint of data saving from the cache memory 15, electric power is supplied to only a range narrower than a range of supply of electric power from the main power supply for the disk array apparatus.

In the case of data saving by the cache BackUp, electric power is supplied to only the cache memory 15, and is not supplied to the flash memory 17. Therefore, the data of the cache memory 15 is not saved in the flash memory 17. Consequently, the data of the cache memory 15 is lost when the main power supply for the disk array apparatus is failed for a long time. Therefore, the disk array apparatus is set in the write-through state.

As explained above, in the data saving mode by the cache BackUp, when the CPU 14 does not receive the notification, which notifies the detection of the electric power failure of the main power supply for the disk array apparatus, from the control IC 22, the CPU 14 turns on the DC/DC converters 23 and 24, and turns off the DC/DC converter 25. When the CPU 14 receives the notification, which notifies the detection of the electric power failure of the main power supply for the disk array apparatus, from the control IC 22, the CPU 14 turns on only the DC/DC converter 23, and turns off the DC/DC converters 24 and 25.

Figure 8:
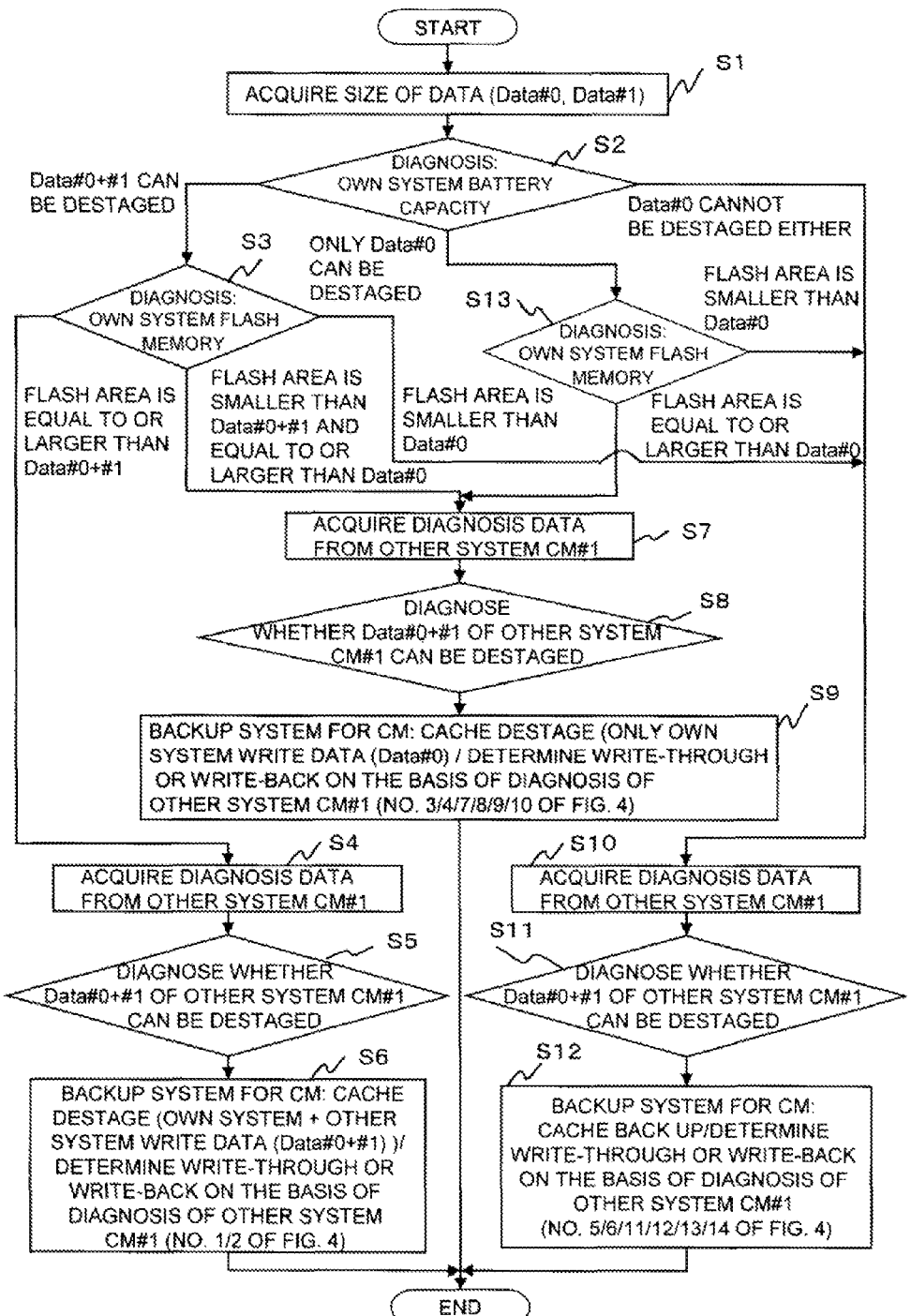
FIG. 8 is a diagnosis processing flowchart of data saving.

FIG. 8 is a diagram illustrating a data saving control processing flowchart. FIG. 8 illustrates data saving control processing in the control module CM#0 of the disk array apparatus illustrated in FIG. 1.

When the main power supply for the disk array apparatus, for example, an AC (alternating current) power supply is turned on, AC power is supplied from the main power supply for the disk array apparatus to the disk array apparatus. Electric power is supplied to the control module 1 via the power supply unit 4 and charging of the battery 13 is started.

When electric current is supplied to the control module 1, the disk array apparatus is started and the CPU 14 of the control module 1 generates (loads) the cache memory management table 1511, the diagnosis timing table 1512, the data saving mode table 1513, the battery table 1514, and the flash memory table 1515.

Then, the data saving control processing illustrated in FIG. 8 is executed. The data saving control processing illustrated in FIG. 8 is executed, for example, during power recovery of the disk array apparatus. The data saving control processing illustrated in FIG. 8 may be repeatedly executed, for example, at a period set in advance during the operation of the disk array apparatus.

The CPU 14A of the control module CM#0 acquires the size of Data#0 and the size of Data#1 of the cache memory 15A of the own system referring to the cache memory management table 1511 of the own system (step S1).

The CPU 14A of the control module CM#0 diagnoses the battery capacity of the battery 13A of the own system (step S2). As explained above, the battery capacity of the battery 13A of the own system is a part of the own system state information.

Specifically, the CPU 14A determines whether the battery capacity of the battery 13A of the own system is equal to or larger than a battery capacity which can save the all Write data (Data#0+#1) of the cache memory 15A of the own system in the flash memory 17A of the own system, whether the battery capacity of the battery 13A of the own system is equal to or larger than a battery capacity which can save the own system Write data (Data#0) (and, in addition, smaller than a battery capacity which can save the all Write data (Data#0+#1)), and whether the battery capacity of the battery 13A of the own system is smaller than a battery capacity which can save the own system Write data (Data#0). In other words, the CPU 14A determines whether the all Write data (Data#0+#1) can be destaged, the own system Write data (Data#0) can be destaged, or the own system Write data (Data#0) cannot be destaged. "Destage" means that the data of the cache memory 15 of the own system is saved in the flash memory 17 of the own system.

When the battery capacity of the battery 13A of the own system enables Destage of Data#0+#1, the CPU 14A of the control module CM#0 further diagnoses the memory capacity of the flash memory's saving area of the flash memory 17A of the own system (step S3). As explained above, the memory capacity of the flash memory's saving area of the flash memory 17A of the own system is a part of the own system state information.

Specifically, the CPU 14A determines whether the flash memory's saving area of the flash memory 17A of the own system is equal to or larger than a memory capacity to which the all Write data (Data#0+#1) of the cache memory 15A of the own system can be saved, whether the flash memory's saving area of the flash memory 17A of the own system is equal to or larger than a memory capacity to which the own system Write data (Data#0) can be saved and smaller than a memory capacity to which the all Write data (Data#0+#1) can be saved, and whether the flash memory's saving area of the flash memory 17A of the own system is smaller than a memory capacity to which the own system Write data (Data#0) can be saved. In FIG. 8, the flash memory's saving area is simply represented as flash area.

When the flash memory's saving area of the own system is equal to or larger than the memory capacity to which the all Write data (Data#0+#1) can be saved, the CPU 14A of the control module CM#0 acquires diagnosis data of the other system from the CPU 14B of the control module CM#1 of the other system (step S4). The CPU 14A determines, based on the diagnosis data acquired from the CPU 14B of the control module CM#1, whether the all Write data (Data#0+#1) can be destaged in the control module CM#1 of the other system (step S5).

As explained above, the diagnosis data is data indicating whether the state of the control module CM#1 of the other system is "all Write data possible", in other words, other system state information.

Then, the CPU 14A of the control module CM#0 determines a data saving mode for the cache memory 15A of the own system, and further determines, based on the diagnosis data of the control module CM#1 of the other system, an apparatus state of the disk array apparatus (step S6). Then, the CPU 14A of the control module CM#0 notifies the CPU 14B of the control module CM#1 of the apparatus state of the disk array apparatus.

Specifically, in step S6, the CPU 14A of the control module CM#0 determines the data saving mode for the cache memory 15A of the own system as "all Write data Destage". Then, when the state of the control module CM#1 of the other system is "all Write data possible", the CPU 14A of the control module CM#0 sets the disk array apparatus in the write-back state. This is equivalent to the case No. 1 in the data saving mode table 1513 illustrated in FIG. 4. When the state of the control module CM#1 of the other system is not "all Write data possible", in step S6, the CPU 14A of the control module CM#0 sets the disk array apparatus in the write-back state. This is equivalent to the case No. 2 in the data saving mode table 1513 illustrated in FIG. 4.

When the flash memory's saving area of the own system is equal to or larger than the memory capacity to which the own system Write data (Data#0) can be saved and smaller than the memory capacity to which the all Write data (Data#0+#1) can be saved in step S3, the CPU 14A of the control module CM#0 acquires diagnosis data of the other system from the CPU 14B of the control module CM#1 of the other system (step S7). The CPU 14A determines, based on the diagnosis data acquired from the CPU 14B of the control module CM#1, whether the all Write data (Data#0+#1) can be destaged in the control module CM#1 of the other system (step S8).

Then, the CPU 14A of the control module CM#0 determines a data saving mode for the cache memory 15A of the own system based on a determination result in step S8, and further determines an apparatus state of the disk array apparatus based on the diagnosis data of the control module CM#1 of the other system (step S9). Then, the CPU 14A of the control module CM#0 notifies the CPU 14B of the control module CM#1 of the apparatus state of the disk array apparatus.

Specifically, in step S9, the CPU 14A of the control module CM#0 determines the data saving mode for the cache memory 15A of the own system as "own system Write data Destage". Then, when the state of the control module CM#1 of the other system is "all Write data possible", the CPU 14A of the control module CM#0 sets the disk array apparatus in the write-back state. This is equivalent to the case No. 3 in the data saving mode table 1513 illustrated in FIG. 4. When the state of the control module CM#1 of the other system is not "all Write data possible", in step S9, the CPU 14A of the control module CM#0 sets the disk array apparatus in the write-through state. This is equivalent to the case No. 4 in the data saving mode table 1513 illustrated in FIG. 4.

When the flash memory's saving area is smaller than the memory capacity to which the own system Write data (Data#0) can be saved in step S3, the CPU 14A of the control module CM#0 acquires diagnosis data of the other system from the CPU 14B of the control module CM#1 of the other system (step S10). The CPU 14A determines, based on the diagnosis data acquired from the CPU 14B of the control module CM#1, whether the all Write data (Data#0+#1) can be destaged in the control module CM#1 of the other system (step S11).

Then, the CPU 14A of the control module CM#0 determines a data saving mode for the cache memory 15A of the own system, and further determines an apparatus state of the disk array apparatus based on the diagnosis data of the control module CM#1 of the other system (step S12). Then, the CPU 14A of the control module CM#0 notifies the CPU 14B of the control module CM#1 of the apparatus state of the disk array apparatus.

Specifically, in step S12, the CPU 14A of the control module CM#0 determines the data saving mode for the cache memory 15A of the own system as "cache BackUp". Then, when the state of the control module CM#1 of the other system is "all Write data possible", the CPU 14A of the control module CM#0 sets the disk array apparatus in the write-back state. This is equivalent to the case No. 5 in the data saving mode table 1513 illustrated in FIG. 4. When the state of the control module CM#1 of the other system is not "all Write data possible", in step S12, the CPU 14A of the control module CM#0 sets the disk array apparatus in the write-through state. This is equivalent to the case No. 6 in the data saving mode table 1513 illustrated in FIG. 4.

On the other hand, when the battery capacity of the battery 13A of the own system is equal to or larger than a battery capacity which can save the own system Write data (Data#0) (and smaller than a battery capacity which can save the all Write data (Data#0+#1) in step S2, the CPU 14A of the control module CM#0 further diagnoses a memory capacity of the flash memory's saving area of the flash memory 17A of the own system (step S13). Specifically, the CPU 14A determines whether the flash memory's saving area of the flash memory 17A of the own system is equal to or larger than a battery capacity which can save the own system Write data (Data#0) or smaller than the battery capacity which can save the own system Write data (Data#0).

In step S13, the CPU 14A does not determine whether the memory capacity of the flash memory's saving area is equal to or larger than a memory capacity to which the all Write data (Data#0+#1) of the cache memory 15A of the own system can be saved. This is because, as explained above, the battery capacity of the battery 13A of the own system can not save the all Write data (Data#0+#1).

As a result of the determination in step S13, when the flash memory's saving area of the own system is equal to or larger than a memory capacity to which the own system Write data (Data#0) can be saved, the CPU 14A of the control module CM#0 executes steps S7 to S9.

Consequently, in step S9, the CPU 14A of the control module CM#0 determines the data saving mode for the cache memory 15A of the own system as "own system Write data Destage". Then, when the state of the control module CM#1 of the other system is "all Write data possible", the CPU 14A of the control module CM#0 sets the disk array apparatus in the write-back state. This is equivalent to the cases No. 7 and No. 9 in the data saving mode table 1513 illustrated in FIG. 4. When the state of the control module CM#1 of the other system is not "all Write data possible", in step S9, the CPU 14A of the control module CM#0 sets the disk array apparatus in the write-through state. This is equivalent to the cases No. 8 and No. 10 in the data saving mode table 1513 illustrated in FIG. 4.

As explained above, the CPU 14A does not determine whether the capacity of the flash memory's saving area is equal to or larger than a memory capacity to which the all Write data (Data#0+#1) can be saved. Therefore, in the data saving mode table 1513, the cases No. 7 and No. 9 are not distinguished and the cases No. 8 and No. 10 are not distinguished.

In step S13, when the flash memory's saving area of the own system is smaller than a memory capacity to which the own system Write data (Data#0) can be saved, the CPU 14A of the control module CM#0 executes steps S10 to S12.

Consequently, in step S12, the CPU 14A of the control module CM#0 determines the data saving mode for the cache memory 15A of the own system as "cache BackUp". Then, when the state of the control module CM#1 of the other system is "all Write data possible", the CPU 14A of the control module CM#0 sets the disk array apparatus in the write-back state. This is equivalent to the case No. 11 in the data saving mode table 1513 illustrated in FIG. 4. When the state of the control module CM#1 of the other system is not "all Write data possible", in step S12, the CPU 14A of the control module CM#0 sets the disk array apparatus in the write-through state. This is equivalent to the case No. 12 in the data saving mode table 1513 illustrated in FIG. 4.

On the other hand, when the battery capacity of the battery 13A of the own system is smaller than a battery capacity which can save the own system Write data (Data#0) in step S2, the CPU 14A of the control module CM#0 executes steps S10 to S12.

Consequently, the CPU 14A of the control module CM#0 determines the data saving mode of the cache memory 15A of the own system as "cache BackUp". Then, when the state of the control module CM#1 of the other system is "all Write data possible", the CPU 14A of the control module CM#0 sets the disk array apparatus in the write-back state. This is equivalent to the case No. 13 in the data saving mode table 1513 illustrated in FIG. 4. When the state of the control module CM#1 of the other system is not "all Write data possible", the CPU 14A of the control module CM#0 sets the disk array apparatus in the write-through state. This is equivalent to the case No. 14 in the data saving mode table 1513 illustrated in FIG. 4.

Data saving control processing in the control module CM#1 of the disk array apparatus is basically the same as the processing illustrated in FIG. 8.

However, since the CPU 14B of the control module CM#1 does not determine an apparatus state of the disk array apparatus, steps S5, S8, and S11 in FIG. 8 are omitted. In steps S6, S9, and S12 in FIG. 8, the CPU 14B of the control module CM#1 only executes the processing for determining the data saving mode in the control module CM#1 of the own system, and does not execute processing for determining an apparatus state of the disk array apparatus. On the other hand, in steps S6, S9, and S12 in FIG. 8, the CPU 14B of the control module CM#1 receives and stores the notification of the apparatus state of the disk array apparatus from the CPU 14A of the control module CM#0, and executes cache control in the write-through state or the write-back state according to the notification.

In steps S4, S7, and S10 in FIG. 8, the CPU 14B of the control module CM#1 returns, in response to a request from the CPU 14A of the control module CM#0, state information of the control module CM#1 (other system state information) as a response. At this point, when the state of the control module CM#1 is the cases No. 1 and No. 2, the response is "all Write data possible". When the state of the control module CM#1 is the cases No. 3 to No. 14, the response is "all Write data impossible".

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A control method of a disk array apparatus having first and second control modules, and a disk array for storing data which is written or read by the first and second control modules, the control method comprising:

controlling, by a first processor in the first control module, a first cache memory, a first battery that supplies electric power to the first cache memory during an electric power failure of a main power supply for the disk array apparatus, a first memory controller that writes data in the first cache memory, and a first nonvolatile memory to which the data of the first cache memory is saved;

controlling, by a second processor in the second control module, a second cache memory, a second battery that supplies electric power to the second cache memory during an electric power failure of the main power supply for the disk array apparatus, a second memory controller that writes data in the second cache memory, and a second nonvolatile memory to which the data of the second cache memory is saved;

acquiring, by the first processor of the first control module, second system state information describing a state of the second battery and a state of the second nonvolatile memory and indicating whether data may be saved from the second cache memory to the second nonvolatile memory; and determining, by the first processor of the first control module, based on combination of the acquired second system state information and first system state information of the first control module, whether the disk array apparatus is set in a write-back state or a write-through state, the first system state information describing a state of the first battery and a state of the first nonvolatile memory and indicating whether data may be saved from the first cache memory to the first nonvolatile memory.

2. The control method of the disk array apparatus according to claim 1, wherein the second system state information of the second control module is information describing, among data written in the second cache memory of the second control module, whether both dirty data which is write data not written in the disk array and mirroring data which is a copy of the dirty data written in the first cache memory of the first control module may be saved in the second nonvolatile memory of the second control module, and wherein, when the second system state information of the second control module describes that both the dirty data and the mirroring data written in the second cache memory of the second control module may be saved in the second nonvolatile memory of the second control module, the first processor of the first control module sets the disk array apparatus in the write-back state irrespective of the first system state information of the first control module.

3. The control method of the disk array apparatus according to claim 2, wherein, when a battery capacity of the second battery of the second control module is equal to or larger than a battery capacity which may save both the dirty data and the mirroring data written in the second cache memory of the second control module in the second nonvolatile memory of the second control module and a memory capacity of the second nonvolatile memory of the second control module is equal to or larger than a memory capacity to which both the dirty data and the mirroring data written in the second cache memory of the second control module may be saved, the second system state information of the second control module describes that both the dirty data and the mirroring data written in the second cache memory of the second control module may be saved in the second nonvolatile memory of the second control module.

4. The control method of the disk array apparatus according to claim 2, wherein the system state information of the first control module is information describing, among data written in the first cache memory of the first control module, whether both dirty data which is write data not written in the disk array and mirroring data which is a copy of the dirty data written in the second cache memory of the second control module or only the dirty data written in the first cache memory of the first control module may be saved in the first nonvolatile memory of the first control module, and wherein the first processor of the first control module determines where data may be saved to the first nonvolatile memory from the first cache memory of the first control module according to the first system state information of the first control module.

5. The control method of the disk array apparatus according to claim 4, wherein, when the first system state information of the first control module describes that both the dirty data and the mirroring data written in the first cache memory of the first control module may be saved in the first nonvolatile memory of the first control module, the first processor of the first control module provides electric power from the first battery to the first cache memory, the first processor, the first memory controller, and the first nonvolatile memory of the first control module during the electric power failure of the main power supply of the disk array apparatus, and saves both the dirty data and the mirroring data written in the first cache memory of the first control module in the first nonvolatile memory of the first control module.

6. The control method of the disk array apparatus according to claim 4, wherein, when the first system state information of the first control module describes that only the dirty data written in the first cache memory of the first control module may be saved in the first nonvolatile memory of the first control module, the first processor of the first control module provides electric power from the first battery to the first cache memory, the first processor, the first memory controller, and the first nonvolatile memory of the first control module during the electric power failure of the main power supply of the disk array apparatus, and saves only the dirty data written in the first cache memory of the first control module in the first nonvolatile memory of the first control module.

7. The control method of the disk array apparatus according to claim 4, wherein, when the first system state information of the first control module describes that the dirty data written in the first cache memory of the first control module may not be saved in the first nonvolatile memory of the first control module, the first processor of the first control module provides electric power from the first battery to only the first cache memory among the first cache memory, the first processor, the first memory controller, and the first nonvolatile memory of the first control module during the electric power failure of the main power supply of the disk array apparatus.

8. A disk array apparatus comprising:
a disk array for storing data which is written or read by first and second control modules;
a first control module including a first processor, a first cache memory, a first battery that supplies electric power to the cache memory during an electric power failure of a main power supply for the disk array apparatus, a first memory controller that writes data in the cache memory, and a first nonvolatile memory to which the data of the cache memory is saved, the first processor controlling the first cache memory, the first battery, the first memory controller and the first nonvolatile memory, the first processor acquiring second system state information from a second control module and determining a state to which the disk array apparatus is to be set in; and
a second control module including a second processor, a second cache memory, a second battery that supplies electric power to the cache memory during the electric power failure of the main power supply for the disk array apparatus, a second memory controller that writes data in the cache memory, and a second nonvolatile memory to which the data of the cache memory is saved, the second processor controlling the second cache memory, the second battery, the second memory controller and the second nonvolatile memory,
wherein the first processor of the first control module acquires the second system state information describing a state of the second battery and a state of the second nonvolatile memory and indicating whether data may be saved from the second cache memory to the second nonvolatile memory, and
wherein the first processor of the first control module determines based on combination of the acquired second system state information and first system state information of the first control module, whether the disk array apparatus is set in a write-back state or a write-through state, the first system state information describing a state of the first battery and a state of the first nonvolatile memory and indicating whether data may be saved from the first cache memory to the first nonvolatile memory.

* * * * *